(12) United States Patent
Opheim et al.

(10) Patent No.: US 7,299,415 B2
(45) Date of Patent: Nov. 20, 2007

(54) METHOD AND APPARATUS FOR PROVIDING HELP INFORMATION IN MULTIPLE FORMATS

(75) Inventors: Greg Opheim, St. Paul, MN (US); Walt Sigtermans, Apple Valley, MN (US); Sean Wilson, Isanti, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 760 days.

(21) Appl. No.: 10/463,748

(22) Filed: Jun. 16, 2003

(65) Prior Publication Data

US 2004/0255057 A1   Dec. 16, 2004

(51) Int. Cl.
G06F 3/00   (2006.01)

(52) U.S. Cl. ...................... 715/705; 715/714
(58) Field of Classification Search ........... 715/705, 715/714
See application file for complete search history.

(56) References Cited

U.S. PATENT DOCUMENTS

| | | | |
|---|---|---|---|
| 4,527,271 A | 7/1985 | Hallee et al. | |
| 4,607,325 A | 8/1986 | Horn | |
| 4,657,179 A | 4/1987 | Aggers et al. | |
| 4,734,873 A | 3/1988 | Malloy et al. | |
| 4,763,243 A | 8/1988 | Barlow et al. | |
| 4,764,862 A | 8/1988 | Barlow et al. | |
| 4,885,694 A | 12/1989 | Pray et al. | |
| 4,899,276 A * | 2/1990 | Stadler | 715/705 |
| 4,907,167 A | 3/1990 | Skeirik | |
| 4,910,691 A | 3/1990 | Skeirik | |
| 4,944,035 A | 7/1990 | Aagardl et al. | |
| 4,956,793 A | 9/1990 | Bonne et al. | |
| 4,965,742 A | 10/1990 | Skeirik | |
| 5,006,992 A | 4/1991 | Skeirik | |
| 5,008,810 A | 4/1991 | Kessel et al. | |
| 5,015,934 A | 5/1991 | Holley et al. | |
| 5,018,215 A | 5/1991 | Nasr et al. | |
| 5,043,863 A | 8/1991 | Bristol et al. | |

(Continued)

OTHER PUBLICATIONS

Michelle Corbin Nichols, Chuck Jaynes, Randy Eckhoff□□Developing hardcopy and online information for OS?@ and windows . . . and other impossibilities□□pp. 101-105□□ACM Press 1996.*

(Continued)

*Primary Examiner*—William Bashore
*Assistant Examiner*—Andrea Long
(74) *Attorney, Agent, or Firm*—Marshall, Gerstein & Borun LLP

(57) ABSTRACT

A system and method that provides help information pertaining a process entity, such as a process device, in a number of different formats presents a first display template that enables a user to request the help information in a first format such as a DDHelp format and presents a second template in response to selection of the first template by the user wherein the second template includes the help information in the first format. The system and method then present a third graphical template that enables a user to request the help information in a second format, such as a WinHelp format and present a fourth template in response to selection of the third template by the user wherein the fourth template includes the help information in the second format.

14 Claims, 10 Drawing Sheets

U.S. PATENT DOCUMENTS

| | | |
|---|---|---|
| 5,050,095 A | 9/1991 | Samad |
| 5,070,458 A | 12/1991 | Gilmore et al. |
| 5,121,467 A | 6/1992 | Skeirik |
| 5,134,574 A | 7/1992 | Beaverstock et al. |
| 5,140,530 A | 8/1992 | Guha et al. |
| 5,142,612 A | 8/1992 | Skeirik |
| 5,161,013 A | 11/1992 | Rylander et al. |
| 5,167,009 A | 11/1992 | Skeirik |
| 5,187,674 A | 2/1993 | Bonne |
| 5,193,143 A | 3/1993 | Kaemmerer et al. |
| 5,197,114 A | 3/1993 | Skeirik |
| 5,212,765 A | 5/1993 | Skeirik |
| 5,224,203 A | 6/1993 | Skeirik |
| 5,282,261 A | 1/1994 | Skeirik |
| 5,291,190 A | 3/1994 | Scarola et al. |
| 5,301,101 A | 4/1994 | MacArthur et al. |
| 5,311,447 A | 5/1994 | Bonne |
| 5,333,298 A | 7/1994 | Bland et al. |
| 5,351,184 A | 9/1994 | Lu et al. |
| 5,353,207 A | 10/1994 | Keeler et al. |
| 5,369,599 A | 11/1994 | Sadjadi et al. |
| 5,373,452 A | 12/1994 | Guha |
| 5,384,698 A | 1/1995 | Jelinek |
| 5,390,326 A | 2/1995 | Shah |
| 5,396,415 A | 3/1995 | Konar et al. |
| 5,398,303 A | 3/1995 | Tanaka |
| 5,408,406 A | 4/1995 | Mathur et al. |
| 5,442,544 A | 8/1995 | Jelinek |
| 5,486,920 A | 1/1996 | Killpatrick et al. |
| 5,486,996 A | 1/1996 | Samad et al. |
| 5,488,697 A | 1/1996 | Kaemmerer et al. |
| 5,537,310 A | 7/1996 | Tanake et al. |
| 5,541,833 A | 7/1996 | Bristol et al. |
| 5,546,301 A | 8/1996 | Agrawal et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,572,420 A | 11/1996 | Lu |
| 5,574,638 A | 11/1996 | Lu |
| 5,596,704 A | 1/1997 | Geddes et al. |
| 5,640,491 A | 6/1997 | Bhat et al. |
| 5,666,297 A | 9/1997 | Britt et al. |
| 5,687,090 A | 11/1997 | Chen et al. |
| 5,692,158 A | 11/1997 | Degeneff et al. |
| 5,704,011 A | 12/1997 | Hansen et al. |
| 5,715,158 A | 2/1998 | Chen |
| 5,729,661 A | 3/1998 | Keeler et al. |
| 5,740,324 A | 4/1998 | Mathur et al. |
| 5,742,513 A | 4/1998 | Bouhenguel et al. |
| 5,761,518 A | 6/1998 | Boehling et al. |
| 5,777,872 A | 7/1998 | He |
| 5,781,432 A | 7/1998 | Keeler et al. |
| 5,790,898 A | 8/1998 | Kishima et al. |
| 5,796,609 A | 8/1998 | Tao et al. |
| 5,798,939 A | 8/1998 | Ochoa et al. |
| 5,809,490 A | 9/1998 | Guiver et al. |
| 5,819,050 A | 10/1998 | Boehling et al. |
| 5,819,232 A | 10/1998 | Shipman |
| 5,825,645 A | 10/1998 | Konar et al. |
| 5,826,249 A | 10/1998 | Skeirik |
| 5,842,189 A | 11/1998 | Keeler et al. |
| 5,847,952 A | 12/1998 | Samad |
| 5,859,773 A | 1/1999 | Keeler et al. |
| 5,877,954 A | 3/1999 | Klimasauskas et al. |
| 5,892,679 A | 4/1999 | He |
| 5,892,939 A | 4/1999 | Call et al. |
| 5,898,869 A | 4/1999 | Anderson |
| 5,901,058 A | 5/1999 | Steinman et al. |
| 5,905,989 A | 5/1999 | Biggs |
| 5,907,701 A | 5/1999 | Hanson |
| 5,909,370 A | 6/1999 | Lynch |
| 5,909,541 A | 6/1999 | Sampson et al. |
| 5,909,586 A | 6/1999 | Anderson |
| 5,917,840 A | 6/1999 | Cheney et al. |
| 5,918,233 A | 6/1999 | La Chance et al. |
| 5,924,086 A | 7/1999 | Mathur et al. |
| 5,940,290 A | 8/1999 | Dixon |
| 5,948,101 A | 9/1999 | David et al. |
| 5,949,417 A | 9/1999 | Calder |
| 5,960,214 A | 9/1999 | Sharpe, Jr. et al. |
| 5,960,441 A | 9/1999 | Bland et al. |
| 5,971,581 A * | 10/1999 | Gretta et al. ............ 700/83 |
| 5,984,502 A | 11/1999 | Calder |
| 5,988,847 A | 11/1999 | McLaughlin et al. |
| 6,008,985 A | 12/1999 | Lake et al. |
| 6,033,257 A | 3/2000 | Lake et al. |
| 6,041,263 A | 3/2000 | Boston et al. |
| 6,047,221 A | 4/2000 | Piche et al. |
| 6,055,483 A | 4/2000 | Lu |
| 6,067,505 A | 5/2000 | Bonoyer et al. |
| 6,076,124 A | 6/2000 | Korowitz et al. |
| 6,078,843 A | 6/2000 | Shavit |
| 6,093,211 A | 7/2000 | Hamielec et al. |
| 6,106,785 A | 8/2000 | Havlena et al. |
| 6,108,616 A | 8/2000 | Borchers et al. |
| 6,110,214 A | 8/2000 | Klimasaukas |
| 6,122,555 A | 9/2000 | Lu |
| 6,128,279 A | 10/2000 | O'Neil et al. |
| 6,188,402 B1 * | 2/2001 | Csipkes et al. ............ 715/705 |
| 6,297,822 B1 * | 10/2001 | Feldman ............ 715/705 |
| 6,421,571 B1 | 7/2002 | Spriggs et al. |
| 6,477,531 B1 * | 11/2002 | Sullivan et al. ............ 707/10 |
| 6,788,313 B1 * | 9/2004 | Heil ............ 715/705 |
| 6,799,198 B1 * | 9/2004 | Huboi et al. ............ 709/203 |
| 6,999,990 B1 * | 2/2006 | Sullivan et al. ............ 709/205 |
| 2002/0022894 A1 * | 2/2002 | Eryurek et al. ............ 700/80 |
| 2004/0139073 A1 * | 7/2004 | Bauchot et al. ............ 707/4 |
| 2004/0186927 A1 * | 9/2004 | Eryurek et al. ............ 710/12 |
| 2006/0080607 A1 * | 4/2006 | Cohen et al. ............ 715/705 |

OTHER PUBLICATIONS

John Robertson, Erik Merkus, Athula Ginige□□The Hypermedia Authoring Reasearch Toolkit (HART)□□pp. 177-185□□ACM Press 1994.*

Mathew Ellison□□WinWriters Training for Software User Assistance□□A Review of RoboHelp Office 2002□□2002.*

* cited by examiner

METHOD AND APPARATUS FOR PROVIDING HELP INFORMATION IN MULTIPLE FORMATS

TECHNICAL FIELD

This patent relates generally to computer software, and more particularly, to computer software used in asset management systems to provide help information.

BACKGROUND

Process plants, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. While a typical process plant has many process control and instrumentation devices, such as valves, transmitters, sensors, etc. connected to one or more process controllers which execute software that controls these devices during the operation of the process, there are many other supporting devices which are also necessary for or related to process operation.

Still further, many process plants have other computers associated therewith which execute applications related to business functions or maintenance functions. Many process plants, and especially those which use smart field devices, use asset management applications to help monitor, track, and maintain the devices within the plant regardless of whether these devices are process control and instrumentation devices or are other types of devices. For example, an Asset Management Solutions (AMS) application sold by Fisher-Rosemount Systems, Inc. enables communication with and stores data pertaining to field devices to ascertain and track the operating state of various field devices. An example of such a system is disclosed in U.S. Pat. No. 5,960,214 entitled "Integrated Communication Network for use in a Field Device Management System."

Maintenance personnel who are primarily responsible for ensuring that the actual equipment within the process is operating efficiently and for repairing and replacing malfunctioning equipment, use tools such as maintenance interfaces, the AMS application discussed above, and many other diagnostic tools which provide information about operating states of the devices within the process. To maintain information about various field devices in a process control system, the AMS application maintains a database of information about a number of devices. Generally, various devices used in a process control system can be expected to be manufactured by a number of different manufacturers. It is quite likely that not all of the devices communicate with each other or with the process control devices in the same manner. To overcome the problem of incompatibility among devices manufactured by different manufacturers, the process instrumentation industry uses a standardized digital device communications protocol as defined by a foundation such as the HART Foundation, or the Fieldbus Foundation in order to allow a single application to communicate with multiple device types. Typically, these foundations will have a standard that defines how each device identifies itself to a process control system using a standard communication protocol and a device description (DD), where the DD defines the protocol's application layer and various user interface definitions necessary to communicate with the device. Each device type would typically have its own DD, which is a formal description of the data and operating procedures for a field device, including variables, methods, commands, menus and display formats associated with the device. Information about every accessible variable of the device is included in the DD. Such variables include, for example, process measurements, any derived values, and all the internal parameters such as range, sensor type, choice of linearization, materials of construction, etc.

When the AMS application is implemented in a process plant that uses such a device, the maintenance personal responsible for maintaining up to date device related information may need to get help information about various parameters used to describe such a device. System designers using the AMS software, the 375 Communicator or the HART communicator may use a DD to gain further information about a device. As per the FOUNDATION Fieldbus' or the HART Communication Foundation's DD Language, all HART devices have the option to include DD help text to explain each parameter, method, etc., defined for a specific device. Such DD help text can be displayed on applications such as 275 HART Communicator, AMS, etc. However, not all device manufacturers provide DD help for all parameters, and if they do, this help information is generally not very descriptive. Moreover, DD help provided by a device manufacturer is limited to text information only, i.e., it does not include images, sound, etc.

BRIEF DESCRIPTION OF THE DRAWINGS

The present patent is illustrated by way of examples and not limitations in the accompanying figures, in which like references indicate similar elements, and in which.

DETAILED DESCRIPTION OF THE EXAMPLES

A system enables a user to get help information regarding a device description (DD) in a number of different formats. In a preferred embodiment, a system providing help information in a DDHelp format also allows a user to receive help information in alternate formats, such as WinHelp format, etc. In this embodiment, a system using the DDHelp format provides a user with an option to get help information in an alternate format. The user can select this option by clicking or selecting a button provided with the help information displayed in DDHelp format. When a user selects such a button, the system searches various alternate formats available for providing help information. If an alternate format of providing help information is found, an alternate method of providing help information using such an alternate format is activated. Help information provided by such an alternate format may also include multimedia content, such as images, audio and video.

Generally, computers using any of the Microsoft Windows® family of operating systems have an executable file named Winhelp.exe as a part of such an operating system. Winhelp.exe allows an application running on such a computer to display help information to a user in a WinHelp format. Software applications, such as AMS, use another file named DDHelp.exe to provide help information in a DD format. Enabling a software application using DDHelp.exe to provide help information to a user with Winhelp.exe thereby allows that application to provide help information to a user in more than one format. Moreover, allowing the WinHelp.exe to be executed from a template provided by the DDHelp.exe allows a user to easily access help information in more than one format from a single location.

Figure 1:
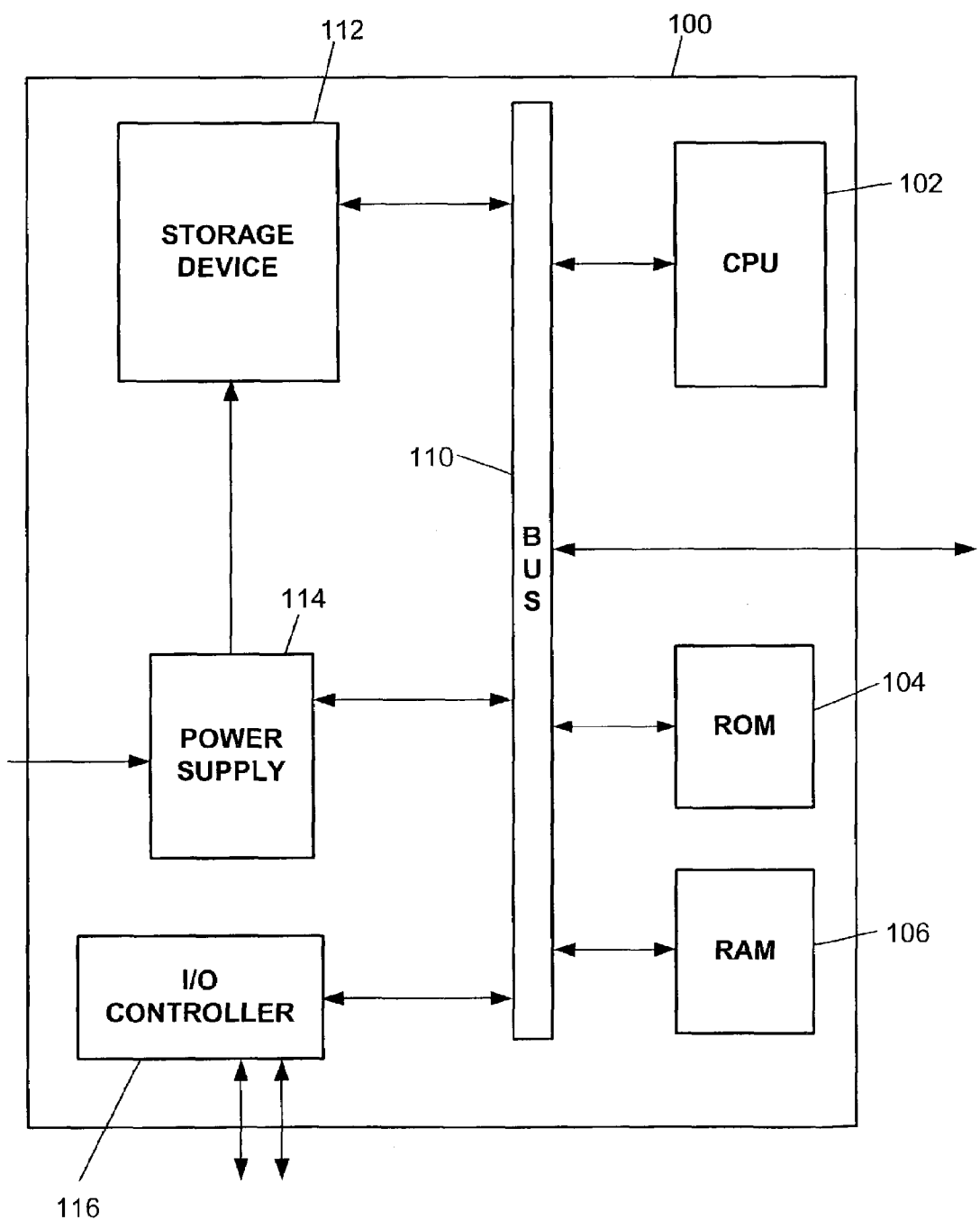
FIG. 1 is a block diagram of an example computer which may be used to provide help information to a 'user in different formats.

Referring now specifically to the accompanying drawings, FIG. 1 is a block diagram of an example computer 100. As used herein, the term "computer" refers to any computer (e.g. portable computer, laptop computer, PDA, desktop computer, server, etc.) that employs any type of software to provide help information. The computer 100 of the instant example includes many conventional hardware components commonly used in computers. For example, as shown in FIG. 1, the computer 100 includes a central processing unit (CPU) 102, a read only memory (ROM) 104, a random access memory (RAM) 106, a communications bus 110, a storage device 112, a power supply 114 and an input/output (I/O) controller 116. Even though the instant example of the computer 100 shows these components internal to the computer, a person of ordinary skill in the art will appreciate that some of these components can be external to the computer 100.

Figure 2:
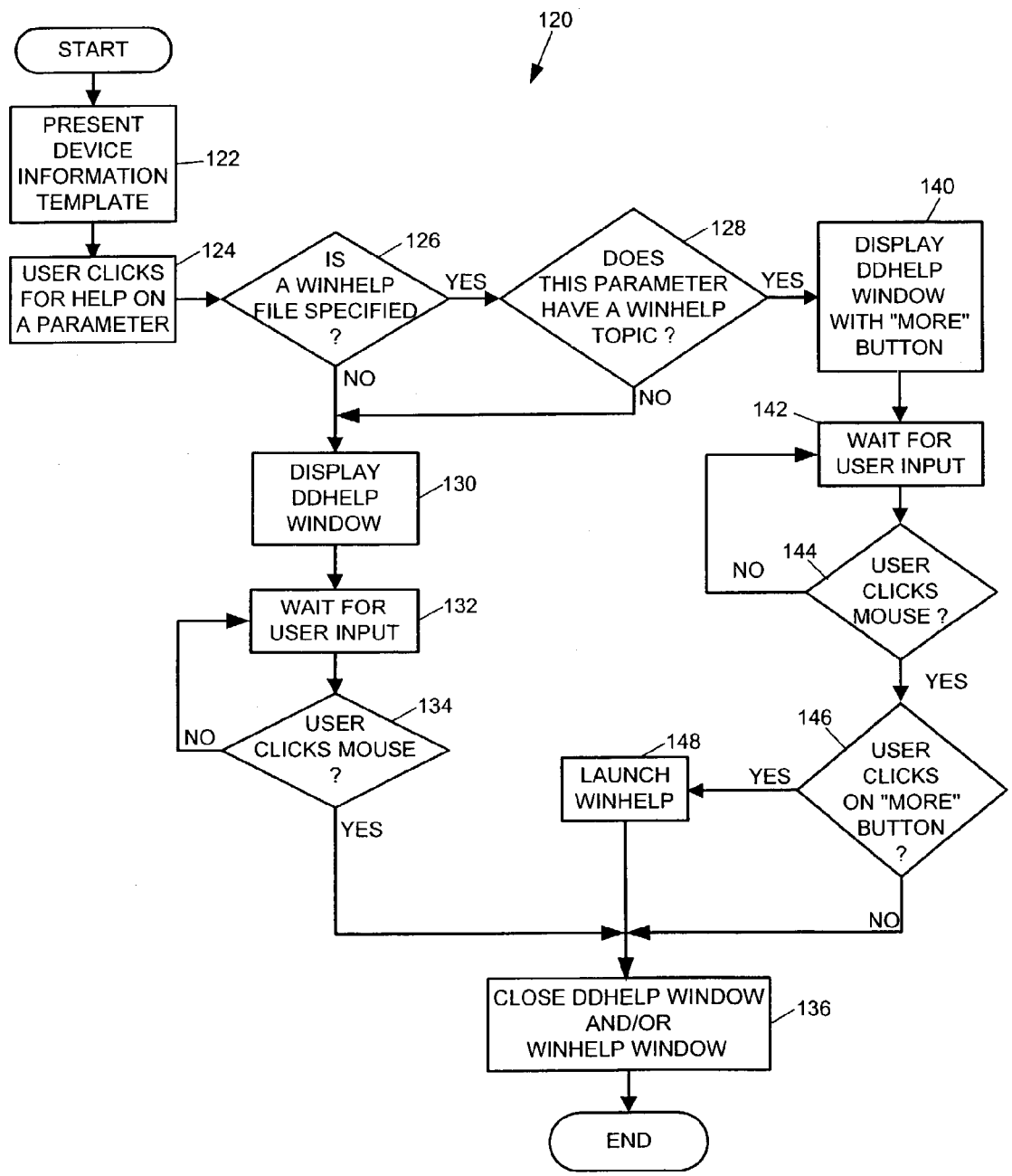
FIG. 2 is a flowchart illustrating an example program to provide help information to a user in different formats.
Figure 3:
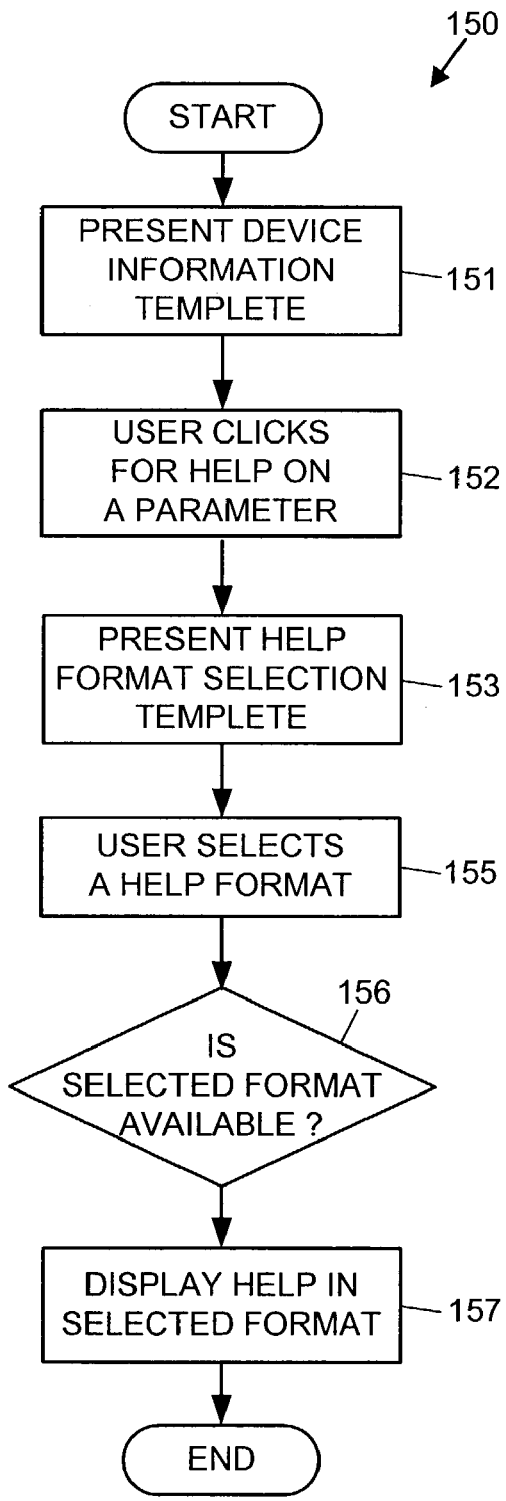
FIG. 3 is a flowchart illustrating another example program to provide help information to a user in different formats.
Figure 4:
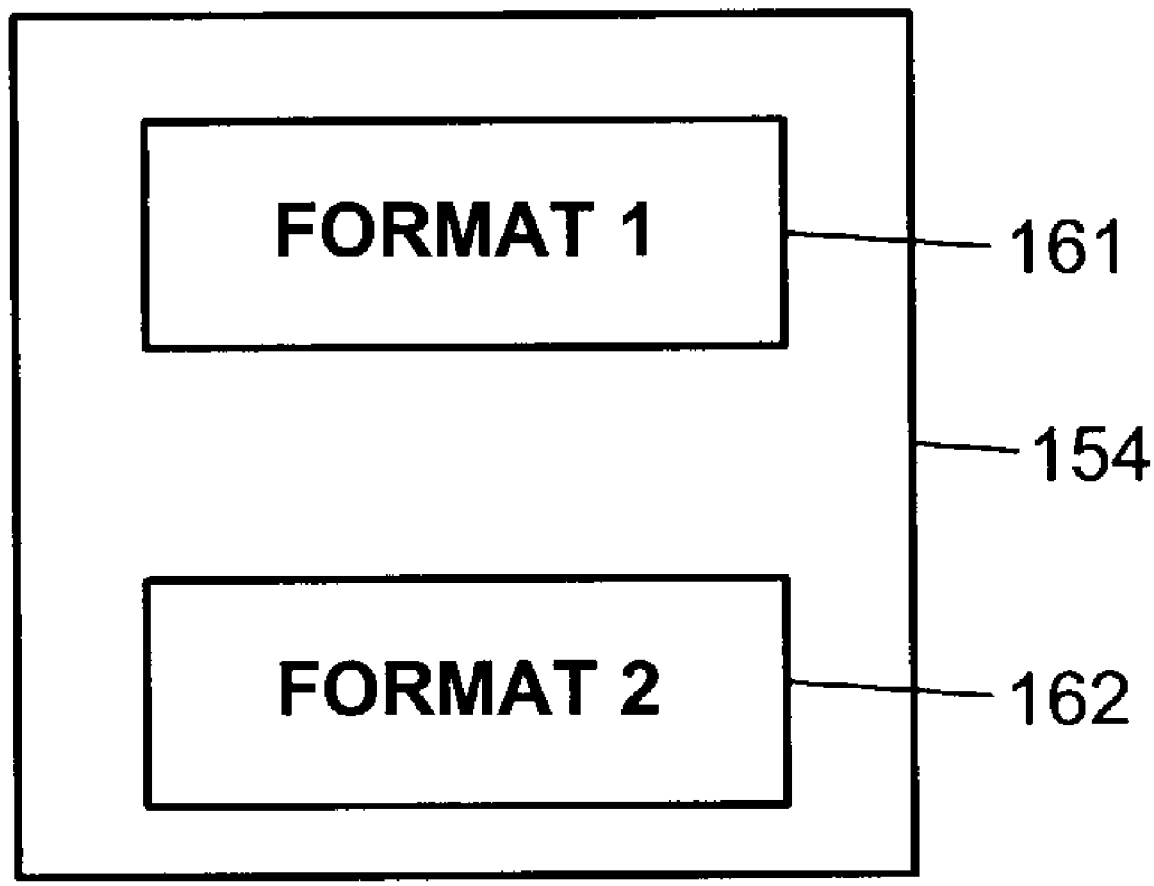
FIG. 4 is an exemplary illustration of a help information selection template.
Figure 5:
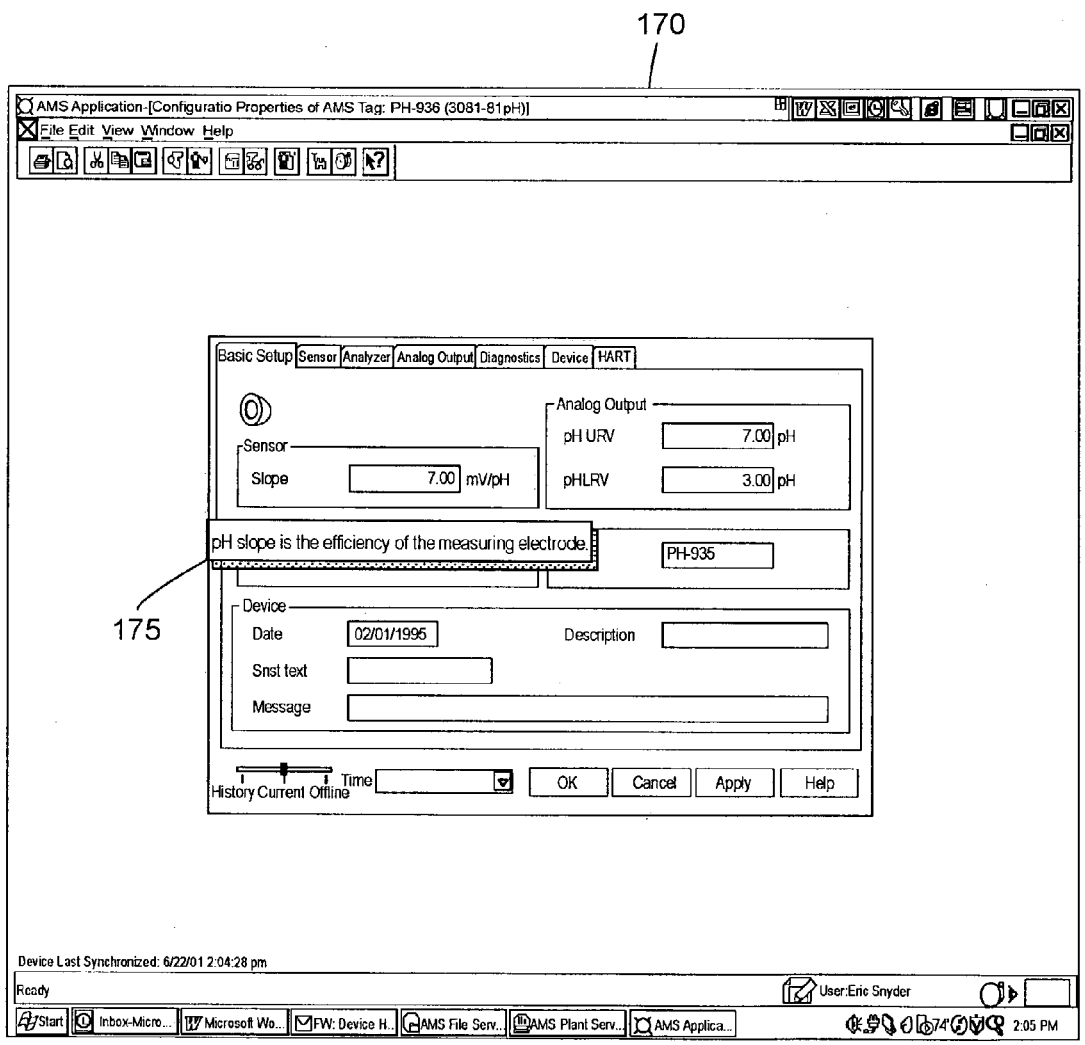
FIG. 5 is an exemplary illustration of a template displaying help information about a device in a DDHelp format.

FIG. 2 is a flowchart illustrating an example help program 120 to provide help information to a user in different formats. Such a program 120 may be written in any desired programming language including, for example, assembly language. The program 120 may be stored in the ROM 104, RAM 106 or the storage device 112 of the example computer 100 of FIG. 1 and is adapted to be executed on the processor 102 of FIG. 1. A block 122 presents a user with a device information template displaying information about various parameters of a device. An example of such a device information template is illustrated in FIGS. 3 to 5. A block 124 of the help program 120 of FIG. 2 enables a user to initiate the help program 120 by clicking on a parameter within the device information template.

A block 126 causes the help program 120 to determine if there is a WinHelp file available within the computer 100 for a device relating to the device information template presented by the block 122. If such a WinHelp file is available, a block 128 determines if the parameter selected by the user at the block 124 has a WinHelp topic defined within the computer 100. If no WinHelp topic is defined for such a parameter, a block 130, displays help information in a DDHelp format by presenting a DDHelp window. Typically, the help program 120 may use a DDHelp.exe file, which may be available on the computer 100, to display the help information in the DDHelp format. However, DDHelp is optional, i.e., various parameters, variables and methods within a DD may or may not have an associated DDHelp.

After the block 120 displays the help information in DDHelp format, a block 132 waits for a further input from the user. If the user clicks a mouse or a key on a keyboard attached to the computer 100 to provide such an input, a block 136 closes the DDHelp window.

If, at the block 128, the help program 120 determines that the parameter selected by the user at the block 124 has a WinHelp topic defined within the computer 100, a block 140 displays help information in a DDHelp format, where such help information includes a "More" button. Subsequently, a block 142 waits for an input from the user. When a block 144 determines that the user has clicked on the appropriate mouse button or a key on the keyboard attached to the computer 100, a block 146 determines whether the user selected the "More" button. If the block 146 determines that the user has selected the "More" button, a block 148, displays a help information template in the WinHelp format. If not, the block 136 closes the DDHelp window.

FIG. 3 is a flowchart illustrating an alternate example help program 150 to provide help information to a user in different formats. Such a program 150 may be written in any desired programming language including, for example, assembly language. The help program 150 may be stored in the ROM 104, RAM 106 or the storage device 112 of the example computer 100 of FIG. 1 and is adapted to be executed on the processor 102 of FIG. 1.

A block 151 presents a user with a device information template displaying information about various parameters of a device. An example of such a device information template is illustrated in FIGS. 3 to 5. A block 152 of the help program 150 enables a user to request the help information about a parameter of a device by clicking on the parameter within the device information template.

A block 153 causes the help program 150 to present a user with a help format selection template 154 that allows the user to select a format used to display the help information. An example of such a help format selection template 154 is illustrated in FIG. 4. A block 155 of the help program 150 enables a user to cause the help program 120 to display the help information in a desired format by clicking on a parameter within the help format selection template 154.

A block 156 causes the help program 150 to determine if the help information is available within the computer 100 in a format selected by the user. If the help information is available in the format selected by the user, a block 157 displays help information in a format selected by the user.

If, at the block 156, the help program 150 determines that the help information is not available within the computer 100 in a format selected by the user, the help program 150 returns to block 153 and presents the help format-selection template 154 to the user.

FIG. 4 is an illustration of an example of the help format selection template 154 presented by the block 153 of the help program 150. The help format selection template 154 of FIG. 4 may be designed using, for example, graphical user interface (GUI) technology. The help format selection template 154 presents a number of selection buttons 161, 162, etc., to a user to allow a user to select a format for the help information. For example a user can select the button 161 to select DDHelp format for the help information. While the help format selection template 154 shown in FIG. 4 includes only two choices for selecting a format for help information, in an alternate implementation more choices may be provided.

FIG. 5 is an exemplary illustration of a device information template 170 along with a DDHelp template 175 displaying help information about a device in a DDHelp format as provided by, for example, the block 130 of FIG. 2. A user can invoke the DDHelp template 175 by clicking on a parameter within the device information template 170. In an alternate embodiment, a user can invoke the DDHelp template 175 by putting focus on a parameter within the device information template 170 and then pressing a help button and/or a function key on a keyboard. The DDHelp template 175 shows help information about a device or a device parameter. For example, the exemplary device information template 170 of FIG. 3 displays information about various parameters of a given device and the DDHelp template 175 provides help information about a device parameter pH slope. A user can click on other parameters listed in the device information template 170 to obtain help information about other parameters of a device. For example, if a user clicks on the "pH LRV" within the device information template 170, the DDHelp template 175 will give help information about the pH log reduction value of the device. While the information contained in the DDHelp template 175 may be obtained from the ROM 104, the RAM 106 or the storage device 112 of the computer 100, in an alternate format, such help information may be obtained from any other computer within a network of computers. Functioning of such a network of computers is further described with respect to FIGS. 6 to 8.

Figure 6:
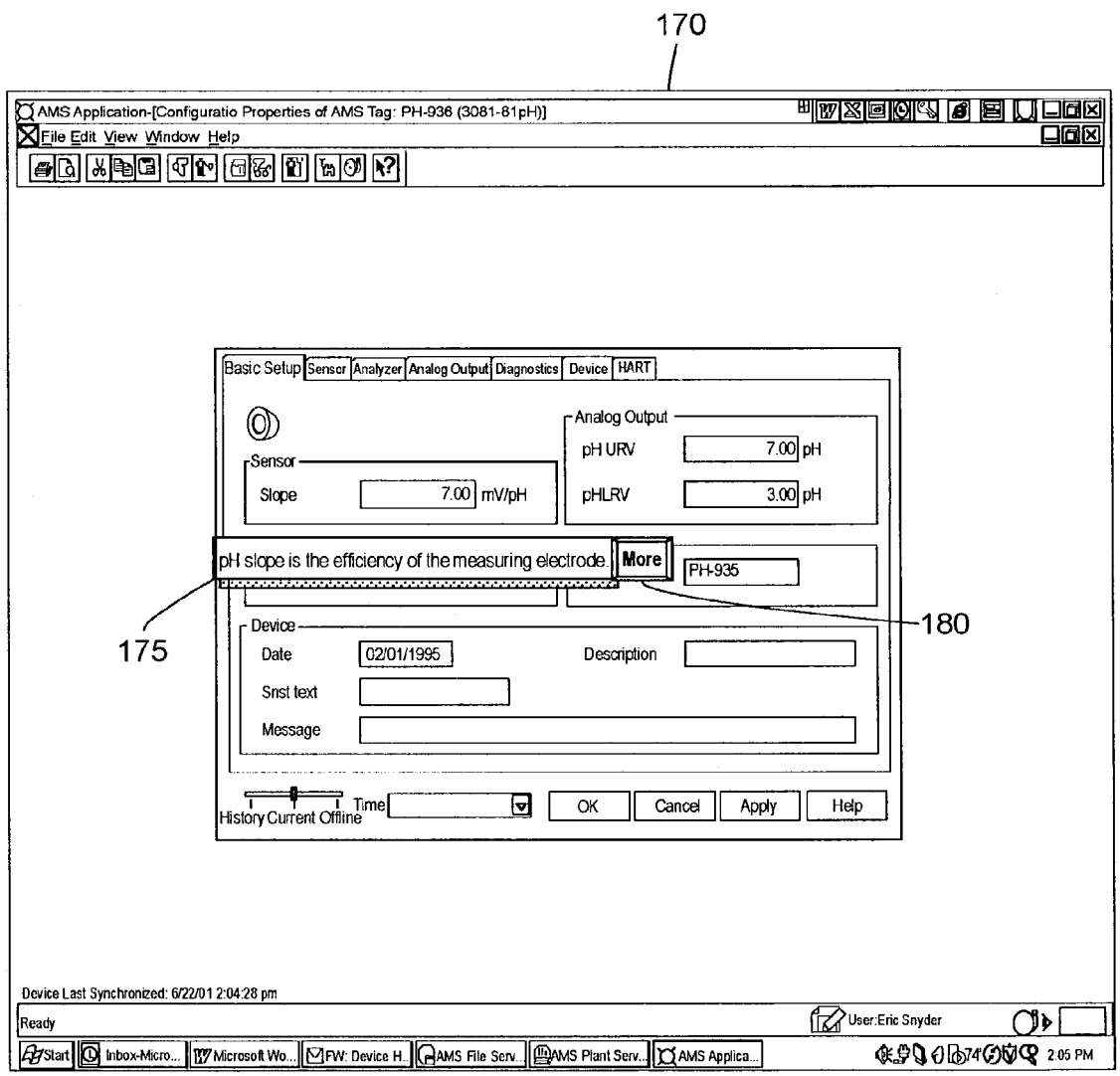
FIG. 6 is an exemplary illustration of an alternate template displaying information about a device in a DDHelp format.

FIG. 6 is an exemplary illustration of the device information template 170 and an alternate form of the DDHelp template 175 displaying information about a device in a DDHelp format as provided by, for example, the block 140 of FIG. 2. The template 175 as shown in FIG. 4 includes help information about a device or a device parameter in the DDHelp format similar to that shown in FIG. 3. However, the DDHelp template 175 as shown in FIG. 4 also includes a "More" button 180 that a user can select to get additional help information in an alternate format other than in DDHelp format. While in this particular embodiment of the system, the DDHelp template 175 shows a "More" button 180 to receive a user's input to get help information in an additional format, in an alternate embodiment, this button may display another text or graphic. An example of such an alternate text may be, for example, "Additional Help," "Alternate Help," etc.

Figure 7:
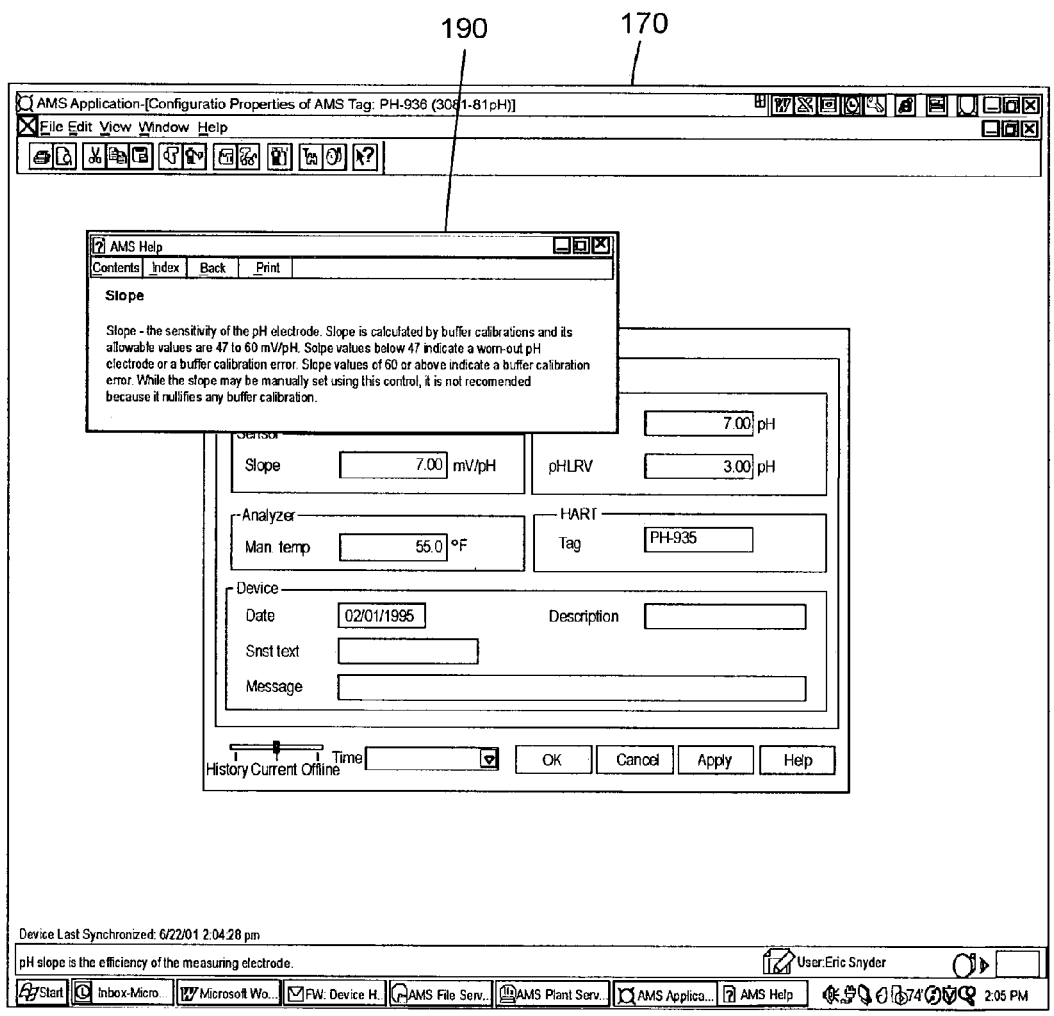
FIG. 7 is an exemplary illustration of a template displaying information about a device in a WinHelp format.

FIG. 7 is an exemplary illustration of the device information template 170 and an exemplary WinHelp template 190 displaying information about a device in a WinHelp format. A user can invoke the WinHelp template 190 by clicking on the "More" button 180 illustrated in FIG. 4. Even though the template 190, as depicted in FIG. 7, illustrates help information in a text format, one of ordinary skill in the art will understand that a template showing help information in the WinHelp format can be modified to show help information in an alternate format such as an audio file, an image file, a video file, etc. For example, in one embodiment, the WinHelp template 190 may have a button allowing a user to play an audio or a video file providing help information about a device parameter. In yet another alternative embodiment, the WinHelp template 190 may have a graphical design explaining a particular characteristic of a device parameter. While the information contained in the WinHelp template 190 may be obtained from the ROM 104, the RAM 106 or the storage device 112 of the computer 100, in an alternate format, such help information may be obtained from any other computer within a network of computers.

Figure 8:
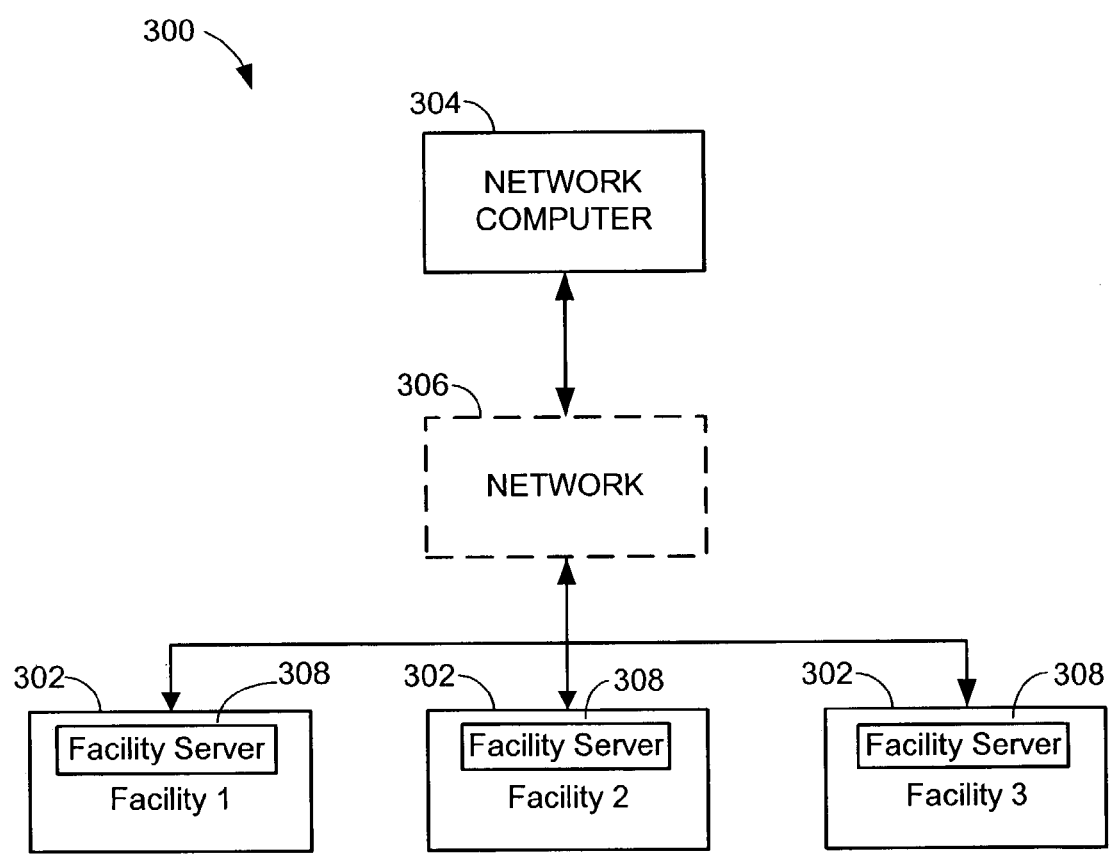
FIG. 8 is a block diagram of a data network adapted to implement the example program of FIG. 2 to provide help information to a user in different formats.

FIG. 8 illustrates a block diagram of a data network 300 adapted to implement the help program 120 of FIG. 2 to provide help information to a user in different formats. Specifically, the data network 300 of FIG. 8 includes a first group of computing facilities 302 adapted to implement the program 120 to provide help information to one or more users in different formats. FIG. 8 illustrates the data network 300 as including a first group of computing facilities 302 operatively coupled to a network computer 304 via a network 306. The plurality of computing facilities 302 may be located, by way of example rather than limitation, in separate geographic locations, in different parts of a process plant, in different areas of the same city, or in different states. The network 306 may be provided using a wide variety of techniques well known to those skilled in the art for the transfer of electronic data. For example, the network 306 may comprise dedicated access lines, standard telephone lines, satellite links, the world wide web, etc., or a combination of these devices. Additionally, the network 306 may include a plurality of network computers or server computers (not shown), each of which may be operatively interconnected in any known or desired manner. Where the network 306 comprises the Internet, data communication may take place over the network 306 via an Internet communication protocol.

The network computer 304 may be a server computer of the type commonly employed in networking solutions and may be used to accumulate, analyze, and download data provided by each of the computing facilities 302. For example, the network computer 304 may periodically receive data from each of the computing facilities 302 indicative of information pertaining to various parameters of various devices, various types of help information available for each of these devices, etc. The computing facilities 302 may include one or more facility servers 308 that may be utilized to store help information about a plurality of devices, device parameters, etc., associated with each facility. Moreover, such information may be stored in different formats, such as in audio information files, video information files, etc.

Although the data network 300 is shown to include one network computer 304 and three computing facilities 302, it should be understood that different numbers of computers 304 and computing facilities 302 may be utilized. For example, the network 306 may include a plurality of network computers 304 and dozens of computing facilities 302, all of which may be interconnected via the network 306. Such a configuration may provide several advantages, such as, for example, enabling near real time uploads and downloads of help information as well as periodic uploads and downloads of help information.

Figure 9:
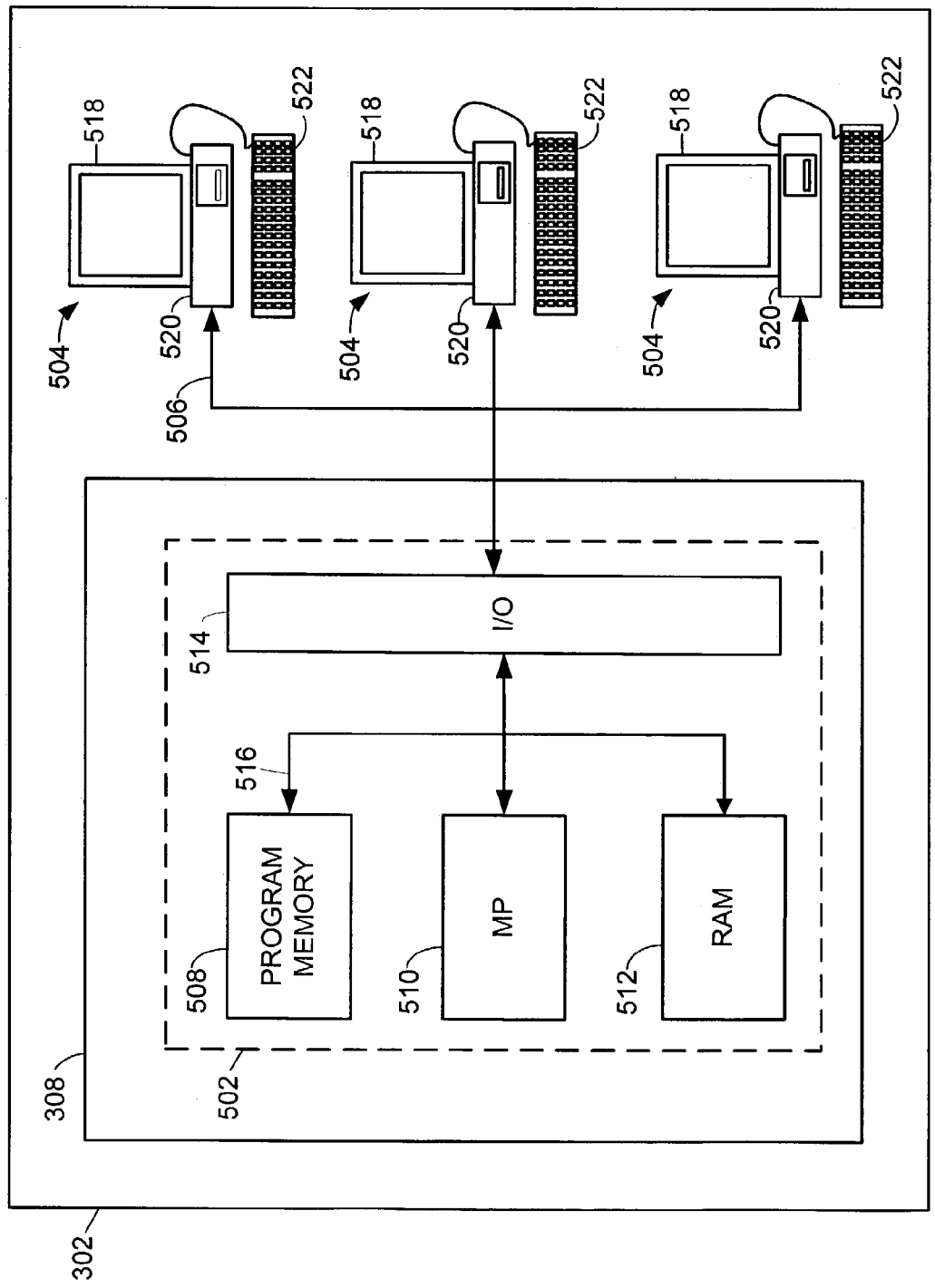
FIG. 9 is a block diagram of a network computer adapted to implement the example program of FIG. 2 to provide help information to a user in different formats.

FIG. 9 is a block diagram of a network computer adapted to implement the help program 120 of FIG. 2 to provide help information to a user in different formats. Specifically, FIG. 9 is a schematic diagram of one possible embodiment of the network computer 304 of in FIG. 8 having a controller 402 that is operatively connected to a central database 404 via a link 406. It should be noted that, while not shown, additional databases may be linked to the controller 402 in any known manner.

The controller 402 may include a program memory 408, a microcontroller or a microprocessor (MP) 410, a random-access memory (RAM) 412, and an input/output (I/O) circuit 414, all of which may be interconnected via an address/data bus 416. It should be appreciated that although only one microprocessor 410 is shown, the controller 402 may include multiple microprocessors 410. Similarly, the controller 402 may include multiple RAMs 412 and multiple program memories 408. Although the I/O circuit 414 is shown as a single block, it should be appreciated that the I/O circuit 414 may include a number of different types of I/O circuits. The RAM(s) 412 and programs memories 408 may be implemented as semiconductor memories, magnetically readable memories, and/or optically readable memories, for example. The controller 402 may also be operatively connected to the network 306 via a communication link 418.

If desired, the help program 120 may be implemented in the program memory 408 and adapted to operate on the microprocessor 410. In yet another embodiment, the help information such as that displayed on the templates 170, 180 and 190 of FIGS. 3-5 may be stored in part or fully on the RAM 412 of the network computer 304. If desired, at least some of the help information displayed in the templates 170, 180 and 190 may be stored in the central database 404.

Figure 10:
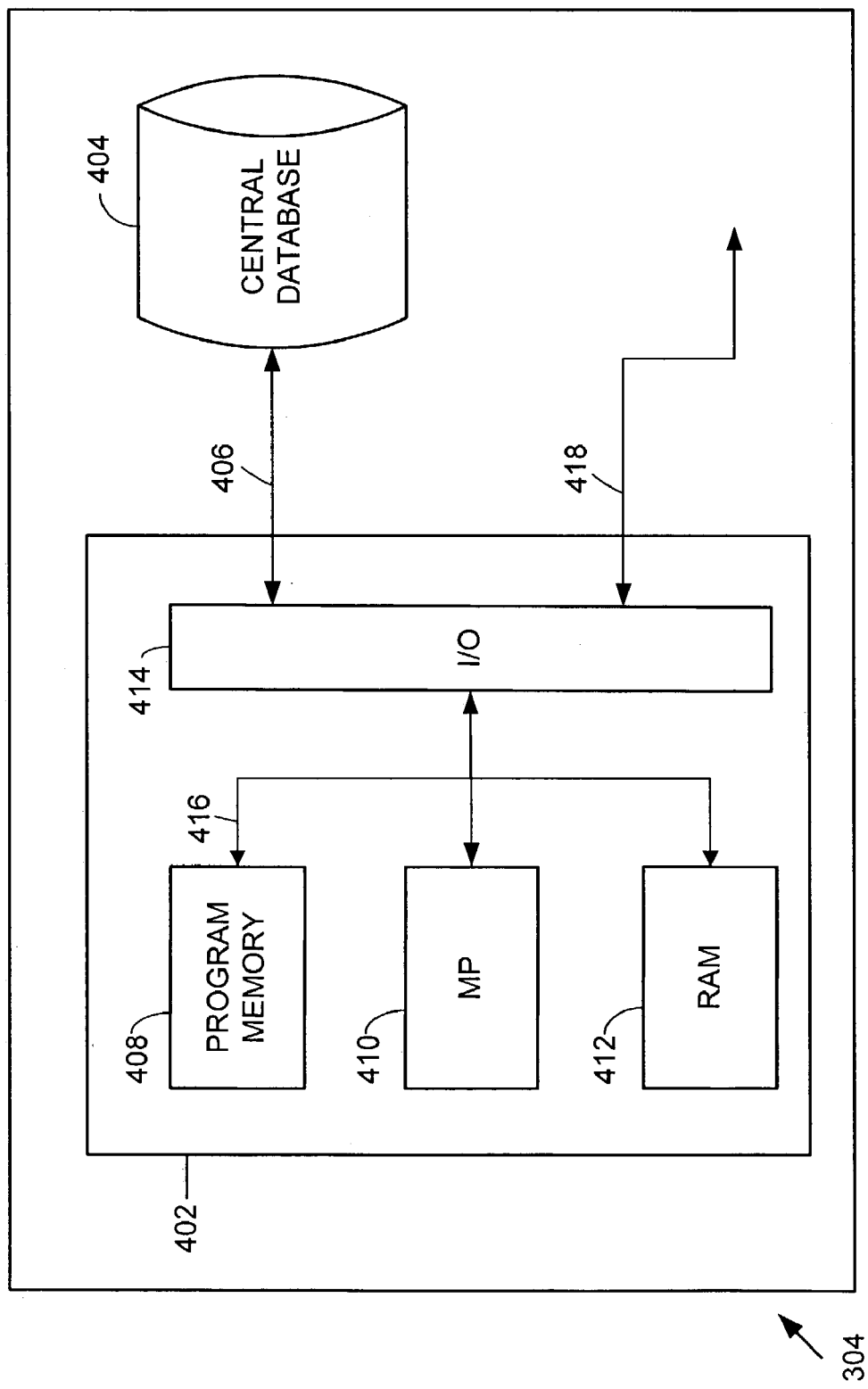
FIG. 10 is a block diagram of a computing facility adapted to implement the example program of FIG. 2 to provide help information to a user in different formats.

FIG. 10 is a schematic diagram of one possible embodiment of several components located in one or more of the computing facilities 302 from FIG. 8. In particular, the computing facilities 302 of FIG. 10 includes a facility server 308, which includes a controller 502, and which is operatively connected to a plurality of client device terminals 504 via a network 506. The network 506 may be a wide area network (WAN), a local area network (LAN), or any other type of network readily known to those persons skilled in the art. The client device terminals 504 may also be operatively connected to the network computer 304 from FIG. 10 via the network 306.

Similar to the controller 402 of FIG. 9, the controller 502 may include a program memory 508, a microcontroller or a microprocessor (MP) 510, a random-access memory (RAM) 512, and an input/output (I/O) circuit 514, all of which may be interconnected via an address/data bus 516. Although only one microprocessor 510 is shown in FIG. 10, the controller 502 may include multiple microprocessors 510. Similarly, the memory of the controller 502 may include multiple RAMs 512 and multiple programs memories 508. Although the I/O circuit 514 is shown as a single block, the I/O circuit 514 may include a number of different types of I/O circuits. Furthermore, the RAM(s) 512 and programs memories 508 may also be implemented as semiconductor memories, magnetically readable memories, optically readable memories, or any other desired type of memory.

The client device terminals 504 may include a display 518, a controller 520 and a keyboard 522 as well as a variety of other input/output devices (not shown) such as a printer, a mouse, a touch screen, a track pad, a track ball, an isopoint, a voice recognition system, etc. Each client device terminal 504 may be signed onto and occupied by a computing employee to assist them in performing their duties. Computing employees may sign onto a client device terminal 504 using any generically available technique, such as entering a user name and password. If a computing employee is required to sign onto a client device terminal 504, this information may be passed via the link 506 to the facility server 308, so that the controller 502 will be able to identify which computing employees are signed onto the system and which client device terminals 504 the employees are signed onto.

Typically, the facility servers 308 store a plurality of files, programs, and other data for use by the client device terminals 504 and the network computer 304. One facility server 308 may handle requests for data from a large number of client device terminals 504. Accordingly, each facility server 308 may include a high end computer with a large storage capacity, one or more fast microprocessors, and one or more high speed network connections. Conversely, relative to a typical facility server 308, each client device terminal 504 may include less storage capacity, a single microprocessor, and a single network connection.

If desired, the help information to be displayed using one or more of the templates 170, 180, 190, etc. may be stored in the program memory 508. Likewise the help program 120 may be stopped in part or in full on the RAM(s) 512 of the computing facilities 302, and one or more of the help information templates 140, 160, 180, etc., may be presented to a user on one or more of the client device terminals 504. Moreover, whereas the help program 120 illustrated by the examples above provides help information in WinHelp and DDHelp formats, in an alternate embodiment, the help program 120 may also provide help information in other help formats in addition to or instead of WinHelp and DDHelp formats.

Although the forgoing text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of providing help information about a process entity, the process entity including a first file defining data and operating procedures associated with at least one process entity parameter, the data including a first help information in a first format, the first help information describing the at least one process entity parameter, the method comprising:

presenting a first template including the data associated with the at least one parameter and enabling a first input requesting the first help information in the first format from the first file, wherein the first format does not include a code within the first help information to define a visual presentation characteristic of the first help information;

receiving the first input;

in response to the first input,
presenting a second template containing the first help information in the first format,
determining if a second file containing a second help information in a second format is available, the second help information further describing the at least one process entity parameter, and the second format includes at least one code within the second help information to define the visual presentation characteristic of the second help information,
presenting a third template if the second help information in the second format is available, the third template enabling a second input requesting the second help information in the second format; and
in response to the second input,
presenting a fourth template containing the second help information in the second format.

2. The method of claim 1, wherein the third template is a part of the second template.

3. The method of claim 1, wherein the first format is a device description help (DDHelp) format.

4. The method of claim 1, wherein the second format is a Windows help (WinHelp) format.

5. The method of claim 1, wherein the fourth template provides the help information in a graphic format.

6. The method of claim 1, wherein the fourth template provides the help information in an audio format.

7. The method of claim 1, wherein the second template and the fourth template provide information regarding various parameters of the process entity.

8. A method of providing help information about a process entity, the process entity including at least one parameter, the process entity further including a first file including data associated with the at least one parameter and a first help information in a first format, the method comprising:
presenting a first template including the data associated with the at least one parameter and enabling a first input requesting the first help information in the first format;
receiving the first input;
presenting a second template in response to the first input, wherein the second template contains the first help information in the first format;
locating a second file including help information in a second format;
determining if the help information in the second file includes a second help information in the second format;
augmenting the second template with a selection entity if the second file includes the second help information in the second format;
receiving a second input via the selection entity, the second input requesting the second help information in the second format wherein the first and second help information describe the data of the at least one parameter; and
presenting a further template in response to the second input, wherein the further template includes the second help information in the second format.

9. The method of claim 8, wherein the first format is a device description help (DDHelp) format and the second format is a Windows help (WinHelp) format.

10. An information system for providing help information about a plurality of process entities used in a process plant, the information system comprising:
a processing unit;
a computer readable memory;
first and second help information in respective first and second formats stored on the computer readable memory, the first and second help information describing a common parameter of one of the plurality of process entities:
a display;
an input device adapted to receive an input signal; and
a software routine stored on the computer readable memory which when executed on the processing unit:
presents a first template adapted to enable a first input requesting the first help information in the first format,
receives the first input,
determines if the second help information in the second format is available on the computer readable memory;
presents a second template in response to the first input, wherein the second template includes the help information in the first format;
augments the second template with a selection entity which receives a second input requesting the second help information in a second format if the second help information in the second format is available on the computer readable memory,
receives the second input via the selection entity if the second help information in the second format is available on the computer readable memory, and
presents a further template in response to the second input, wherein the further template includes the second help information in the second format.

11. The information system of claim 10, wherein the first format is a device description help (DDHelp) format and the second format is a Windows help (WinHelp) format.

12. The information system of claim 10, wherein the software routine executes to present the first template, the second template, and the further template in a graphical user interface (GUI) format.

13. A computer device for use in a process plant containing a plurality of devices, the computer device comprising a computer program embodied on at least one computer readable memory and to be executed on a processing device, the computer program comprising:
first software to present a first template including data for one of the plurality of devices, the template enabling a first input requesting a first help information in a first format;
second software to receive the first input;
third software to present a second template in response to the first input, wherein the second template contains the first help information in the first format, the first help information describing the data;
fourth software to locate a second help information in a second format, the second help information describing the data;
fifth software to present a third template if the second help information is located by the fourth software, the fifth software enabling a second input requesting the second help information in the second format; and
sixth software to present a fourth template in response to the second input, wherein the fourth template contains the second help information in the second format;
wherein the first and second help information does not diagnose a fault of the computer device.

14. The computer program of claim 13, wherein the first format is a device description help (DDHelp) format and the second format is a Windows help (WinHelp) format.

* * * * *

UNITED STATES PATENT AND TRADEMARK OFFICE
CERTIFICATE OF CORRECTION

PATENT NO. : 7,299,415 B2  Page 1 of 1
APPLICATION NO. : 10/463748
DATED : November 20, 2007
INVENTOR(S) : Greg Opheim et al.

It is certified that error appears in the above-identified patent and that said Letters Patent is hereby corrected as shown below:

In the Claims:

At Column 9, lines 41-42, "in formation" should be -- information --.

Signed and Sealed this

Twelfth Day of August, 2008

JON W. DUDAS
*Director of the United States Patent and Trademark Office*